United States Patent
Foulger (12) 
(10) Patent No.: US 6,277,303 B1
(45) Date of Patent: Aug. 21, 2001

(54) CONDUCTIVE POLYMER COMPOSITE MATERIALS AND METHODS OF MAKING SAME

(75) Inventor: Stephen H. Foulger, Lexington, SC (US)

(73) Assignee: Pirelli Cable Corporation, Lexington, SC (US)

( * ) Notice: Subject to any disclaimer, the term of this patent is extended or adjusted under 35 U.S.C. 154(b) by 0 days.

(21) Appl. No.: 09/113,963

(22) Filed: Jul. 10, 1998

(51) Int. Cl.$^7$ .................................................. H01B 1/00
(52) U.S. Cl. .................. 252/500; 252/502; 252/510; 252/511; 252/519.21; 252/519.33
(58) Field of Search .................................. 252/500, 502, 252/510, 511, 519.21, 519.33

(56) References Cited

U.S. PATENT DOCUMENTS

| | | | |
|---|---|---|---|
| 3,735,025 | 5/1973 | Ling et al. | 174/105 |
| 4,265,789 | 5/1981 | Christopherson et al. | 252/511 |
| 4,400,580 | 8/1983 | Yamanouchi et al. | 174/102 SC |
| 4,412,938 | 11/1983 | Kakizaki et al. | 252/511 |
| 4,626,618 | 12/1986 | Takaoka et al. | 174/102 |
| 4,929,388 | 5/1990 | Wessling | 252/500 |
| 5,004,561 | 4/1991 | Nomura et al. | 252/511 |
| 5,037,999 | 8/1991 | VanDeusen | 174/36 |
| 5,098,610 | 3/1992 | Okamura et al. | . |
| 5,174,924 | 12/1992 | Yamada et al. | 252/511 |
| 5,246,783 | 9/1993 | Spenadel et al. | 428/461 |
| 5,248,553 | 9/1993 | Miyashita et al. | . |
| 5,281,757 | 1/1994 | Marin et al. | 174/23 R |
| 5,409,981 | * 4/1995 | Kadooka et al. | 524/413 |
| 5,556,697 | 9/1996 | Flenniken | 428/323 |

FOREIGN PATENT DOCUMENTS

| | | |
|---|---|---|
| 524 700 | 3/1988 | (EP) . |
| 337 487 | 4/1989 | (EP) . |
| WO 98/03578 | 7/1997 | (WO) . |
| WO 98/20503 | 5/1998 | (WO) . |

OTHER PUBLICATIONS

European Search Report No. RS 101469 dated Oct. 16, 1998.

Graham, Gordon et al., Insulating and Semiconductive Jackets for medium and High Voltage Underground Power Cable Applications, *IEEE Electrical Insulation Magazine*, vol. 11, No. 5 (Sep./Oct. 1995), pp. 5–12.

Narkis, Moshe, Structuring and Special Effects in Polymer Systems Containing Carbon Black, (Apr. 2, 1998), pp. 62–63.

Gubbles, F et al., Design of Electrical Conductive Composites: Key Role of the Morphology on the Electrical Properties of carbon Black Filled Polymer Blends, *Macromolecules*, vol. 28, No. 5 (1995), pp. 1559–1566.

(List continued on next page.)

*Primary Examiner*—Yogendra Gupta
*Assistant Examiner*—D G Hamlin
(74) *Attorney, Agent, or Firm*—Norris, McLaughlin & Marcus (57) ABSTRACT

A conductive polymer composite material comprises: a minor phase material comprising a semicrystalline polymer; a conductive filler material dispersed in said minor phase material in an amount sufficient to be equal to or greater than an amount required to generate a continuous conductive network in said minor phase material; and a major phase material, said major phase material being a polymer which when mixed with said minor phase material will not engage in electrostatic interactions that promote miscibility, said major phase material having said minor phase material dispersed therein in an amount sufficient to be equal to or greater than an amount required to generate a continuous conductive network in said major phase material, forming a (semi)conductive ternary composite having distinct co-continuous phases.

16 Claims, 3 Drawing Sheets

OTHER PUBLICATIONS

Tchoudakov, R., et al., Conductive Polymer Blends with Low Carbon Black Loading: Polypropylene/Polyamide, *Polymer Engineering and Science*, vol. 36, No. 10 (May 1996), pp. 1336–1346.

Kirkpatrick, Scott, Percolation and Conduction, *Reviews of Modern Physics*, vol. 45, No. 4 (Oct. 1973), pp. 574–588.

Lux, F., Review Models Proposed to Explain the Electrical Conductivity of Mixtures Made of Conductive and Insulating Materials, *Journal of Materials Science*, vol. 28 (1993), pp. 285–301.

Sherman, R.D., et al., Electron Transport Processes in Conductor–Filled Polymers, *Polymer Engineering and Science*, vol. 23, No. 1 (Jan., 1983) pp. 36–46.

Narkis, M., et al., Resistivity Behavior of Filled Electrically Conductive Crosslinked Polyethylene, *Journal of Applied Polymer Science*, vol. 29 (1984), pp. 1639–1652.

Narkis, M. et al., Segregated Structures in Electrically Conductive Immiscible Polymer Blends, ANTEC '95, pp. 1343–1346.

Breuer, O., et al., Segregated Structures in carbon Black–Containing Immiscible Polymer Blends: HIPS/LLPDE Systems, (May 1997), pp. 1097–1106.

Levon, Kalle, et al., Multiple Percolation in Conducting Polymer Blends, Macromolecules, vol. 26, No. 15 (1993) pp. 4061–4063.

F. Gubbels, S. Blacker, et al., Design of Electrical Conductive Composites: Key Role of the Morphology on the Electrical Properties of Carbon Black Filled Polymer Blends, Macromolecules 1995, vol. 28, pp. 1559–1566.

European Search Report No. EP 99 30 5464 dated Aug. 24, 1999.

Gubbles, F., et al., Selective Localization of Carbon Black in Immiscible Polymer Blends: A Useful Tool to Design Electrical Conductive Composites, *Macromolecules*, vol. 27, No. 7 (1994), pp. 1972–1974.

Kozlowski, M., Electrically Conductive Structured Polymer Blends, *Polymer Networks & Blends*, vol. 5, No. 4 (1995), pp. 163–172.

Tang, H., et al., Electrical Behavior of Carbon Black–Filled Polymer Composites: Effect of Interaction Between Filler and Matrix, *Journal of Applied Polymer Science*, vol. 51, No. 7 (Feb. 1994), pp. 1159–1164.

\* cited by examiner

CONDUCTIVE POLYMER COMPOSITE MATERIALS AND METHODS OF MAKING SAME

FIELD OF INVENTION

The present invention relates generally to conductive polymer composite materials and the method of making such composite materials.

BACKGROUND OF THE INVENTION

The ability of polymers to act as electrical insulators is the basis for their widespread use in the electrical and electronic fields. However, material designers have sought to combine the fabrication versatility of polymers with many of the electrical properties of metals. There are instances when an increased conductivity or relative permittivity of the polymer is warranted, such as in applications which require antistatic materials, low-temperature heaters, electromagnetic radiation shielding and electric field grading. A few select polymers, such as polyacetylene, polyaniline, polypyrrole and others, can be induced to exhibit intrinsic conductivity through doping, though these systems tend to be cost prohibitive and difficult to fabricate into articles.

Percolation theory is relatively successful in modeling the general conductivity characteristics of conducting polymer composite (CPC) materials by predicting the convergence of conducting particles to distances at which the transfer of charge carriers between them becomes probable. The percolation threshold ($p_c$), which is the level at which a minor phase material is just sufficiently incorporated volumetrically into a major phase material resulting in both phases being co-continuous, that is, the lowest concentration of conducting particles needed to form continuous conducting chains when incorporated into another material, can be determined from the experimentally determined dependence of conductivity of the CPC material on the filler concentration. For a general discussion on percolation theory, see the October 1973 Vol. 45, No. 4, Review of Modern Physics article, entitled, *Percolation and Conduction*, the contents of which are herein incorporated by reference. Much work has been done on determining the parameters influencing the percolation threshold with regard to the conductive filler material. See for example, *Models Proposed to Explain the Electrical Conductivity of Mixtures Made of Conductive and Insulating Materials,* 1993 Journal of Materials Science, Vol. 28; *Resistivity of Filled Electrically Conductive Crosslinked Polyethylene,* 1984 Journal of Applied Polymer Science, Vol. 29; and *Electron Transport Processes in Conductor-Filled Polymers,* 1983 Polymer Engineering and Science Vol. 23, No. 1; the contents of each of which are herein incorporated by reference. See also, *Multiple Percolation in Conducting Polymer Blends,* 1993 Macromolecules Vol. 26, which discusses "double percolation", the contents of which are also herein incorporated by reference.

Attempts for the reduction of conductive filler content in CPC materials have been reported for polyethylene/polystyrene and for polypropylene/polyamide, both employing carbon black as the conductive filler. See for example, *Design of Electrical Conductive Composites: Key role of the Morphology on the Electrical Properties of Carbon Black Filled Polymer Blends,* 1995 Macromolecules, Vol. 28 No. 5 and *Conductive Polymer Blends with Low Carbon Black Loading: Polypropylene/Polyamide,* 1996 Polymer Engineering and Science, Vol. 36, No. 10, the contents of both of which are herein incorporated by reference.

SUMMARY OF THE INVENTION

However, none of the prior art has recognized the possibility of multi-phase (more than two polymer components) blends and taken advantage of the full potential of reduction of conductive filler content which can be realized by requiring a highly crystalline material as the minor phase of the immiscible polymer blend, nor have investigated processing approaches to improve the conductive network, nor have employed intrinsically conductive polymers as the conductive filler in the minor phase, as claimed herein.

It is therefore an object of the present invention to provide a conductive polymer composite (CPC) material having reduced conductive filler content while maintaining good conductivity by decreasing the percolation threshold required to generate a continuous conductive network in the composite material by the hereinafter described embodiments.

The present invention improves on the prior art by providing a CPC material and method of making same which results in an improved conductive network with a reduction of conductive filler content by reducing the percolation threshold. The present invention is based on immiscible polymer blends wherein the immiscibility is exploited to create semiconductive compounds with low content conductive filler through a multiple percolation approach to network formation. The conductive filler material content can be reduced to about 6% by weight of the total composite or less, depending, for example, on the final application or conductivity requirements for such application and the conductive filler material itself, without a corresponding loss in the conductivity performance of the compound. Correspondingly, the rheology of the melt phase of the inventive material will more closely follow an unfilled system due to the reduction of the reinforcing conductive filler content thereby increasing the ease of processing the material.

The physics of network formation of a minor second phase material in a differing major phase is effectively described by percolation theory as discussed heretofore. The level at which a minor phase material is just sufficiently incorporated volumetrically into a major phase material resulting in both phases being co-continuous, that is, the lowest concentration of conducting particles needed to form continuous conducting chains when incorporated into another material, is the "percolation threshold" ($p_c$). A minor second phase material in the form of nonassociating spheres, when dispersed in a major phase material, must often be in excess of approximately 16% by volume to generate an infinite network. This 16 volume % threshold which is exemplary for spheres, is dependent on the geometry of the conductive filler particles, (i.e. the surface area to volume ratio of the particle) and may vary with the type of filler. The addition of a single dispersion of conductor filler particles to a single major phase is termed "single percolation". It has been found that by altering the morphology of the minor/major phase a significant reduction in percolation threshold can be realized. The present invention exploits these aspects of percolation theory in developing very low conductive filler content CPC materials.

In accordance with the present invention, a method requiring an immiscible blend of at least two polymers that phase separate into two continuous morphologies is employed. By requiring the conductive filler to reside in the minor polymer phase, the concentration of conductive filler can be concentrated above the percolation threshold required to generate a continuous network in the minor polymer phase while the total concentration of conductive filler in the volume of the combined polymers is far below the threshold if the filler was dispersed uniformly throughout both phases. In addition, since the minor polymer phase is co-continuous within the major polymer phase, the total composite is conductive. This approach employs multiple percolation due to the two or more levels of percolation that are required: percolation of conductive dispersion in a minor phase and percolation of a minor phase in a major phase.

In a binary mixture of a semicrystalline polymer and a conductive filler, the filler particles are rejected from the crystalline regions into the amorphous regions upon recrystallization, which accordingly decreases the percolation threshold. Similarly, using a polymer blend with immiscible polymers which results in dual phases as the matrix in CPC material promotes phase inhomogeneities and lowers the percolation threshold. The conductive filler is heterogeneously distributed within the polymers in this latter example. In one alternative of this approach, either one of the two polymer phases is continuous and conductive filler particles are localized in the continuous phase. In a second alternative, the two phases are co-continuous and the filler is preferably in the minor phase or at the interface.

The present invention concentrates primarily on two aspects of percolation phenomenon: the interaction of the conductive dispersion in the minor phase, and the interaction of the minor phase with the major phase, and shares certain attributes with U.S. application Ser. No. 3,735,025, entitled, Semiconductive Jacket For Cable And Cable Jacketed Therewith, filed on an even date herewith by the same applicant.

In accordance with one aspect of the present invention, a conducting polymer composite material comprises: a minor phase material comprising a semicrystalline polymer; a conductive filler material dispersed in said minor phase material in an amount sufficient to be equal to or greater than an amount required to generate a continuous conductive network in said minor phase material; and a major phase material, said major phase material being a polymer which when mixed with said minor phase material will not engage in electrostatic interactions that promote miscibility, said major phase material having said minor phase material dispersed therein in an amount sufficient to be equal to or greater than an amount required to generate a continuous conductive network in said major phase material, forming a (semi)conductive ternary composite having distinct co-continuous phases.

In accordance with another aspect of the present invention, the minor phase material with conductive filler material dispersed therein has a volume resistivity of about $\leq 10^6$ $\Omega \cdot cm$; and the ternary composite has a volume resistivity of about $\leq 10^6$ $\Omega \cdot cm$. For example, the minor phase material with conductive filler material dispersed therein may have a volume resistivity of about $\leq 10^3$ $\Omega \cdot cm$; and the ternary composite has a volume resistivity of about $\leq 10^3$ $\Omega \cdot cm$. Preferably, the ternary composite has a volume resistivity of about $\leq 10$ $\Omega \cdot cm$.

In accordance with yet another aspect of the present invention, the conductive filler material comprises about $\leq 6$ percent by weight of total conducting polymer composite weight.

In accordance with a further aspect of the present invention, the conducting polymer composite material further comprising: a second major phase material, wherein said ternary composite is dispersed in an amount sufficient for said ternary composite to be continuous within said second major phase material, said second major phase material being selected from a group of polymers which when mixed with said ternary composite will not engage in electrostatic interactions that promote miscibility with said minor phase material or said major phase material, forming a (semi)conductive quaternary composite having distinct co-continuous phases.

In accordance with a further aspect of the present invention, a method of producing a conducting polymer composite material comprises: mixing a semicrystalline polymer having a melting temperature in a mixer, said mixer preheated to above the melting temperature of said semicrystalline polymer; adding a conductive filler material to said semicrystalline polymer in said mixer in an amount $\geq$ an amount required to generate a continuous conductive network in said semicrystalline polymer, mixing said conductive filler material and said semicrystalline for a time and at a speed sufficient to insure a uniform distribution of said conductive filler in said semicrystalline polymer, thereby forming a binary composite; and mixing a major phase material having a melting temperature with said binary composite in said mixer preheated to above the melting temperature of said major phase material, for a time and at a speed sufficient to insure a uniform distribution of said binary composite in said major phase material, such that a weight ratio of said binary composite to said major phase material is sufficient for said binary composite to be $\geq$ an amount required to generate a continuous conductive network in said major phase material, said major phase material being selected from a group of polymers which when mixed with said binary composite will not engage in electrostatic interactions that promote miscibility, such that a (semi)conductive ternary composite with distinct co-continuous phases is formed. (Semi)conductive herein means that the composite may be conductive or semiconductive.

In accordance with yet a further aspect of the present invention, a method of producing a conducting polymer composite material comprises: mixing a semicrystalline minor phase polymer material with a conductive filler material, the conductive filler material being in an amount sufficient to be equal to or greater than an amount required to generate a continuous conductive network within the minor phase polymer material, thereby forming a binary composite; mixing the binary composite with a major phase polymer material to form a (semi)conductive ternary composite; and annealing the ternary composite to coarsen the morphology and thereby further increase conductivity of the composite material, said major phase polymer material being selected from a group of polymers which when mixed with said binary composite will not engage in electrostatic interactions that promote miscibility, such that a (semi) conductive ternary composite with distinct co-continuous phases is formed.

In accordance with yet a further aspect of the present invention, a method of producing a conducting polymer composite material comprises: mixing a semicrystalline minor phase polymer material having a melting temperature with a conductive filler material, the conductive filler material being in an amount sufficient to be equal to or greater than an amount required to generate a continuous conductive network within the minor phase polymer material, thereby forming a binary composite; annealing the binary composite; and mixing the binary composite with a major phase polymer material at a temperature below the melting temperature of the binary composite, said major phase polymer material being selected from a group of polymers which when mixed with said binary composite will not engage in electrostatic interactions that promote miscibility, thereby forming a (semi)conductive ternary composite having distinct co-continuous phases.

Still further in accordance with the present invention, a method of producing a conducting polymer composite material comprises: mixing a mixing a semicrystalline minor phase polymer material with a conductive filler material, the conductive filler material being in an amount sufficient to be equal to or greater than an amount required to generate a continuous conductive network within the minor phase polymer material, thereby forming a binary composite; mixing the binary composite with a major phase polymer material to form a ternary composite; mixing the ternary composite with a second major phase polymer material to form a (semi)conductive quaternary composite; and annealing the quaternary composite to coarsen the morphology and thereby further increase the conductivity of the composite material, said major phase polymer material being selected from a group of polymers which when mixed with said binary composite will not engage in electrostatic interactions that promote miscibility, such that a (semi)conductive ternary composite with distinct co-continuous phases is formed.

In general, the superior results of the present invention may be achieved by allowing the conductive filler material to reside in a minor phase of the immiscible blend; the minor phase being a semicrystalline polymer having a relatively high crystallinity, such as between about 20% and about 80%, and preferably about $\geq 70\%$, thereby causing the conductive filler aggregates to concentrate in amorphous regions of the minor phase or at the interface of the continuous minor and major phases. Annealing processes of the composite at different points in the mixing process or modifying the morphology of the minor phase can further increase the crystalline phase or further coarsen the morphology of the blend and thereby improve the conductive network.

In accordance with the present invention, in order that a favorable phase morphology, that is, phase separation, develops between minor and major phase materials, the minor and major phase materials must be such that when mixed, the minor and major phase polymeric materials do not engage in electrostatic interactions that promote miscibility resulting in a negative enthalpy of mixing. Thus, hydrogen bonding does not occur between any of the phases and there is phase separation between all of the phases.

An advantage of the present invention includes the ability to produce CPC materials having good conductivity with significant reduction of conductive filler content.

Another advantage is cost reduction due to the reduced conductive filler content and ease of processing.

BRIEF DESCRIPTION OF THE DRAWINGS

Other objects, features and advantages of the present invention will be apparent from the following detailed description of the presently preferred embodiments in conjunction with the accompanying drawings in which.

DETAILED DESCRIPTION OF THE INVENTION

CPC materials having good conductivity with significant reduction of conductive filler content of the present invention are based on a conductive filler dispersed in a minor phase material, forming a binary composite; the binary composite being mixed with at least one major phase polymeric material. More specifically, the present invention may be achieved by adhering to the hereinafter discussed four general principles and alternate hereinafter described embodiments. (1) The conductive filler content is preferably at or just greater than the percolation threshold in the minor phase material (i.e. the lowest concentration of conductive filler content required to generate a continuous conductive network in the minor phase material); (2) the minor phase content is at or just greater than the percolation threshold in the major phase material (i.e. the lowest concentration of minor phase material required to generate a continuous conductive network in the major phase material); (3) the minor phase material must be semicrystalline; and (4) the major/minor phase blend must be immiscible having distinct co-continuous phases.

In accordance with one embodiment of the present invention, a conducting polymer composite material comprises: a minor phase material comprising a semicrystalline polymer; a conductive filler material dispersed in said minor phase material in an amount sufficient to be equal to or greater than an amount required to generate a continuous conductive network in said minor phase material; and a major phase material, said major phase material being a polymer which when mixed with said minor phase material will not engage in electrostatic interactions that promote miscibility, said major phase material having said minor phase material dispersed therein in an amount sufficient to be equal to or greater than an amount required to generate a continuous conductive network in said major phase material, forming a (semi)conductive ternary composite having distinct phases.

The material chosen for the conductive filler in any of the embodiments of the present invention influences the amount of conductive filler required to meet or exceed the percolation threshold to form a conductive network in the minor phase. The conductive filler material may be any suitable material exhibiting conductivity and should have a chemical structure which results in an inherently high conductivity and affinity to develop a strong network. The conductive filler material may be selected from the group consisting of CB, graphite, metallic particles, intrinsically conductive polymers, carbon fibers, and mixtures thereof. In particular, the CB may be an "acetylene black" or a "furnace black" or any commercial grade of conductive CB, the acetylene blacks being superior in producing conductive blends. Exemplary CBs are also disclosed in U.S. Pat. No. 5,556, 697, the contents of which are herein incorporated by reference. "Furnace blacks" are lower quality CBs and are inferior in their ability to produce conductive blends when compared to "acetylene blacks", which are fabricated from the pyrolysis of acetylene. Therefore "acetylene blacks" are most preferred in the present invention over other CB types. Intrinsically conductive polymers, such as polyacetylene, polyaniline, polypyrrole, mixtures thereof and the like, are also preferable for optimizing the reduction of conductive filler in the present invention and thus may also be employed as the conductive filler material. These polymers generally have conductivity's higher than that of even acetylene blacks, but are more costly. Also, carbon fibers or "whiskers" may be employed and will have a lower weight percent content than that of CB or intrinsically conductive polymers to exceed percolation threshold.

An important feature of the present invention is the low amount of conductive filler material employed while still maintaining a desired level of conductivity. The particular weight percent of conductive filler material employed is dependent upon the type of conductive filler material, and the type of minor phase material and major phase material. One skilled in the art would recognize that such values may be determined experimentally for each set of chosen materials. An important criteria, however, is that it is an amount sufficient to meet or exceed the percolation threshold which varies depending upon the selected materials. For example, in the working example set forth hereinafter it may be seen that the minor phase material may be about 44% by weight HDPE; the conductive filler may be about $\leq$6% by weight furnace grade CB; and the major phase material may be about 50% by weight EVA, the EVA having a VA content of from about 12% to about 45% by weight. If an acetylene black or an intrinsically conductive polymer is used as the conductive filler in this example, the conductive filler content may be $\leq$about 6% and preferably $\leq$about 4% by weight. Based on the foregoing and for example, the minor phase material may be from about 30% to about 50% by weight HDPE, and the EVA may be from about 65 to about 50% by weight EVA depending on the VA content in the EVA.

Material selection is important in achieving the superior results of the present invention. For example, the minor phase material for each embodiment of the present invention must be semicrystalline in nature and the crystallinity may range from about 20% to about 80% and preferably $\geq$70% based on the heat of fusion of a perfect crystal. Suitable minor phase materials include any semicrystalline polymer such as HDPE, polypropylene, polypropene, poly-l-butene, poly(styrene) (PS), polycarbonate, poly(ethylene terephthalate), nylon 66, nylon 6 and mixtures thereof.

One skilled in the art would recognize that the level of minor phase material content required to meet or exceed the percolation threshold in the major phase material is dependent on the constituents of the system such as the conductive filler material and major phase material(s), and the description and examples set forth herein should serve as a guide. For example, it has been found that for an HDPE/EVA/CB system with a VA content of 40% that the minor phase HDPE/CB should be about $\geq$45% and preferably 50% to meet the mechanical properties required in a suitable cable jacket material, although less is needed to meet the electrical properties.

Suitable materials for the major phase material may be any polymeric material which meets the afore-described criteria for not engaging in electrostatic interactions that promote miscibility in relation to the heretofore described suitable minor phase materials. It should be noted that minor electrostatic interactions may be permissible within the above criteria as long as miscibility is not promoted. That is, the blend must be immiscible. Suitable materials for the major phase material may include, for example, EVA, polybutylene terephthalate, PS, poly(methyl methacrylate) (PMMA), polyethylene, polypropylene, polyisobutylene, poly(vinyl chloride), poly(vinylidene chloride), poly (tetrafluoroethylene), poly(vinyl acetate), poly(methyl acrylate), polyacrylonitrile, polybutadiene, poly(ethylene terephthalate), poly(8-aminocaprylic acid), poly (hexamethylene adipamide) and mixtures thereof.

As indicated above, one skilled in the art will recognize that the selection and amount of major phase material employed is also dependent upon the constituents of the system, and the description and examples set forth herein should serve as a guide.

In furtherance to the above, exemplary major/minor pairs may include the following. That is, minor phase materials polyethylene, polypropene and poly-1-butene may be paired with major phase materials PS, poly(vinyl chloride), poly (vinylidene chloride), poly(tetrafluoroethylene), poly(vinyl acetate), poly (methyl acrylate), poly(methyl methacrylate), polyacrylonitrile, polybutadiene, poly(ethylene terephthalate), poly(8-aminocaprylic acid), poly (hexamethylene adipamide). Similarly, minor phase materials PS, polycarbonate, poly(ethylene terephthalate), nylon 66 and nylon 6 may be paired with major phase materials polyethylene, polypropylene and polyisobutylene.

Another embodiment of the present invention employs a minor phase material of HDPE with a crystallinity of greater than about 70%, conductive filler of furnace grade CB and a major phase material of EVA. If the VA in the EVA is greater than about 40% by weight, the HDPE/CB minor phase material with a 12% by weight conductive filler content in the minor phase material (which is about 6% by weight of total composite), should be equal to or in excess of about 50% by weight of the total composite to meet both conductivity and mechanical property criteria for semiconductive cable jackets, for example. However, if the VA of the EVA is less than about 40% by weight, the EVA is more crystalline, and the level of HDPE/CB minor phase material may be less than about 50% by weight of the total composite provided that the HDPE/CB content is sufficient to exceed the percolation threshold required to generate a continuous conductive network in the EVA. Whether or not the HDPE/CB content is sufficient to exceed the percolation threshold required to generate a continuous conductive network in the EVA may be verified experimentally by measuring the volume resistivity of the material. For example, a volume resistivity of about $10^6$ $\Omega$·cm-$10^8$ $\Omega$·cm or less would indicate that the material is (semi)conductive.

In accordance with another embodiment of the present invention, the conducting polymer composite material further comprises a second major phase material, wherein said ternary composite is dispersed in an amount sufficient for said ternary composite to be continuous within said second major phase material, said second major phase material being selected from a group of polymers which when mixed with said ternary composite will not engage in electrostatic interactions that promote miscibility with said minor phase material or said major phase material, forming a (semi) conductive quaternary composite having distinct co-continuous phases.

The second major phase material may be selected as described above for the previously discussed major phase material.

One skilled in the art would recognize that the amount of ternary composite sufficient for the ternary composite to be continuous within the second major phase material is dependent upon the constituents of the system and may be determined experimentally by measuring volume resistivity as a function of ternary composite content to ensure that semiconductivity results.

It also should be noted that for quaternary blends, all four constituents (i.e. conductive filler, minor phase, and two major phases) must be mutually insoluble for the temperature and conditions of the material use.

In accordance with a further embodiment of the present invention, a method of producing a conducting polymer composite material is disclosed. In this embodiment, a semicrystalline polymer having a melting temperature is mixed in a mixer, wherein the mixer is preheated to above the melting temperature of the semicrystalline polymer.

A conductive filler material is added to the semicrystalline polymer in the mixer in an amount $\geq$ an amount required to generate a continuous conductive network in the semicrystalline polymer. For example, the conductive filler material may be added in an amount between about 0.1 weight percent and about 12 weight percent for a HDPE/EVA/CB system. However, one skilled in the art would recognize that the amount of conductive filler material employed is dependent upon the conductive filler material and the other particular constituents of the system.

The conductive filler material and semicrystalline polymer are conventionally mixed for a time and at a speed sufficient to insure a uniform distribution of the conductive filler in the semicrystalline polymer, thereby forming a binary composite.

A major phase material having a melting temperature is mixed with the binary composite in a mixer preheated to above the melting temperature of the major phase material, for a time and at a speed sufficient to insure a uniform distribution of said binary composite in the major phase material. The weight ratio of the binary composite to the major phase material is sufficient for the binary composite to be $\geq$ the percolation threshold required to generate a continuous conductive network in the major phase material, the major phase material being selected from a group of polymers which when mixed with the binary composite will not engage in electrostatic interactions that promote miscibility, such that a (semi)conductive ternary composite with distinct phases co-continuous is formed.

For example, the following non-limiting parameters may be employed: from about 0.1% by weight to about 6% by weight conductive filler; from about 49.9% by weight to about 44% by weight HDPE; and about 50% by weight EVA if VA is about 40% by weight.

The semicrystalline polymer may be selected from the afore-described minor phase materials and may be present in the amounts described therefor.

In accordance with a further embodiment of the present invention, a second major phase material having a melting temperature is conventionally mixed with the afore-described ternary composite in a mixer preheated to above the melting temperature of the second major phase material, for a time and at a speed sufficient to insure a uniform distribution of said ternary composite in the second major phase material. The weight ratio of the ternary composite to the second major phase material is sufficient for the ternary composite to be $\geq$ the percolation threshold required to generate a continuous conductive network in the second major phase material, the second major phase material being selected from a group of polymers which when mixed with the ternary composite will not engage in electrostatic interactions that promote miscibility, such that a (semi) conductive quaternary composite with distinct co-continuous phases is formed. The second major phase material may be as previously described for the major phase material.

Thus, it can be seen that in accordance with the present invention, more than two phases can be blended to further reduce the conductive filler content by weight percent of the final composite. For example, preferably, the conductive filler content is just above percolation threshold in a minor phase material forming a binary composite. The binary composite is mixed just above the percolation threshold with a major phase material, forming a ternary composite. The ternary composite is mixed with a second major phase material just above the percolation threshold. A quaternary composite results which preferably has less than about 3% by weight conductive filler content with respect to the total quaternary composite weight, yet which forms a continuous conductive network in the composite. A requirement for this embodiment is that the resultant composite is an immiscible blend with distinct phases, and that the conductive filler is in the continuous minor phase. For example, a quaternary composite of the present invention could be formed with a minor phase of "furnace grade" CB in HDPE; the CB comprising about 3.6% by weight of the quaternary composite and about 26.4% by weight HDPE, the major phase material being about 30% by weight EVA and about 40% by weight PS. Of course other combinations meeting the requirements of the present invention will be apparent to those skilled in the art.

In a like manner, conducting polymer composite materials of the invention can be formed with more than two major phase materials. For example, the heretofore described quaternary composite may be mixed in an amount sufficient to exceed the amount required to generate a continuous conductive network with a third major phase material, said third major phase material being such that it will not engage in electrostatic interactions that promote miscibility with the second, first or minor phase materials. Thus the resultant composite is an immiscible blend with distinct phases. In accordance with the present invention, (semi)conductive composite materials may be formed by repeating the heretofore described mixing procedure with any number of further major phase materials which meet the requirements for major phase materials set forth heretofore such that the resultant (semi)conductive composite material is an immiscible polymer blend having distinct co-continuous phases.

The resulting composites of the present invention can be further enhanced by conventional annealing processes. That is, in accordance with a further embodiment of the present invention, the afore-described ternary composite, binary composite and/or quaternary composite may be annealed thereby coarsening the morphology of the respective composite. For example, the percolation threshold of the minor phase in the major phase may be further reduced by preferably annealing the final CPC composite from approximately just above the melting temperature of both the minor phase material and the major phase material. This results in reinforcing the phase separation between the major and minor phase materials by coarsening the morphology of the composite, and thus resulting in the formation of a CPC material with reduced conductive filler content which maintains good conductivity.

Alternately, according to the present invention, the percolation threshold of the conductive filler in the minor phase material can be reduced by annealing the minor phase/conductive filler composite before mixing in the major phase material. The annealing will result in the threshold concentration for forming conductive networks in the binary composite to be lower when employing semicrystalline polymers as the minor phase material, such as HDPE or isostatic polypropylene. During the crystallization process a major part of the conductive filler particles are rejected into interspherulitic boundaries and the remaining, non-rejected conductive filler particles may be located in amorphous regions with in the spherulites, resulting in the heretofore described reduction in percolation threshold. Thus annealing of the foregoing minor phase/conductive filler composite refines and increases the crystalline phase. The afore-described binary composite may be annealed to below the binary composite's melting temperature prior to mixing the afore-described major phase material with the binary composite, wherein the major phase material has a melting temperature less than the binary composite's melting temperature. The major phase material and the binary composite being mixed at a temperature below the melting temperature of the binary composite.

In a further embodiment of the present invention, a reduction of the percolation threshold of the minor phase material in the major phase material may be achieved by modifying the surface area to volume ratio of the minor phase material, thereby increasing the minor phase's affinity to create a conductive network, before mixing the minor phase with the major phase material. This can be accomplished by pulverizing (i.e. crushing) the binary composite of minor phase material with conductive filler dispersed therein, or more preferably by extruding thread-like structures of binary composite as described below. The pulverized or thread-like structures of binary composite are then mixed with the major phase material below the melting temperature of the minor phase material. It is noted that one skilled in the art would readily know how to pulverize the afore-described material.

In further accordance with another embodiment of the present invention, the afore-described binary composite may be extruded into threadlike structures prior to mixing the major phase material with the binary composite, the major phase material having a melting temperature less than the binary composite's melting temperature, wherein the major phase material and the extruded threadlike structures of the binary composite are mixed at a temperature below the melting temperature of the binary composite. The threadlike structures may be, for example, about 2 mm long and about 0.25 mm in diameter; the extrusion of the binary composite into thread-like structures being done by conventional extrusion techniques as is known in the art.

It is therefore apparent that in applications for CPC materials requiring very high conductivities, (resistivities of about $\rho \leq 10^3$ $\Omega \cdot cm$), conductive filler content above the reduced percolation threshold may be employed using the methods of the present invention to produce CPC materials of the present invention.

The principles of the invention can be further illustrated by the following non-limiting examples.

EXAMPLE 1

Working

CPC materials having reduced CB content were made according to the present invention using commercial grades of a random copolymer of EVA, HDPE, and furnace grade CB. The characteristics of the materials used in this example are set forth in Table 1. In particular, the EVA was selected to have a high concentration, 45% by weight, of VA in order to reinforce the phase separation between the minor phase material (HDPE/CB) and the major phase (EVA). EVA's with lower weight % VA are less preferable but could be substituted without departing from the general principles of the invention.

All composites were mixed at 170° C. in a Brabender internal mixer with a 300 cm$^3$ cavity using a 40 rpm mixing rate. The mixing procedure for the ternary composites comprises adding the HDPE into the preheated rotating mixer and allowing the polymer to mix for 6 minutes prior to the addition of the CB. After the addition of the CB, the compound is mixed for an additional 9 minutes, which insures a uniform distribution of CB within the HDPE. The EVA is added and the mixture allowed to mix for an additional 10 minutes. The blends are designated as $M_0$, $M_5 \ldots M_{100}$ and are presented in Table 2.

TABLE 1

| Constituent | Tradename | Characteristics | Producer |
|---|---|---|---|
| EVA | Levapren 450 | 45 weight % VA content | Bayer Corporation |
| HDPE | Petrothene LS6081-00 | Density = 0.963 g/cm$^3$ | Millennium Chemical |
| CB | Vulcan XC72 | N$_2$ Surface Area = 254 m$^2$/g DBP oil absorption = 174 cm$^3$/100 g mean particle diameter = 300 Å | Cabot Corporation |

TABLE 2

| Constituent (w/w) | $M_0$ | $M_5$ | $M_{10}$ | $M_{15}$ | $M_{20}$ | $M_{25}$ | $M_{30}$ | $M_{35}$ | $M_{40}$ | $M_{45}$ | $M_{50}$ | $M_{100}$ |
|---|---|---|---|---|---|---|---|---|---|---|---|---|
| EVA | 100.0 | 95.0 | 90.0 | 85.0 | 80.0 | 75.0 | 70.0 | 65.0 | 60.0 | 55.0 | 50.0 | 0.0 |
| HDPE | 0.0 | 4.4 | 8.8 | 13.2 | 17.6 | 22.0 | 26.4 | 30.8 | 35.2 | 39.6 | 44.0 | 88.0 |
| CB | 0.0 | 0.6 | 1.2 | 1.8 | 2.4 | 3.0 | 3.6 | 4.2 | 4.8 | 5.4 | 6.0 | 12.0 |

In all of the ternary EVA/HDPE/CB composites, the CB was maintained at a 12% by weight ratio to the HDPE; the subscript in the composite designation denotes the weight percent of the HDPE/CB component in the ternary composite. In addition, binary composites of HDPE/CB and EVA/CB were prepared in a manner similar to the ternary composites (170° C./40 rpm/6 minutes mix time for the unfilled polymer and 9 additional minutes mix time with CB). The final compounds were then molded at a pressure of about 6 MPa for 12 minutes at 170° C. into plaques of about 0.75 mm in thickness.

An Olympus Model BHT-112 optical microscope, coupled with a Linkam Model THMS 600 hot stage, was used to confirm the tendency of the molded ternary composites to undergo phase separation at temperatures above the melting point of the HDPE and EVA.

The electrical conductivity of the resultant composites were measured; the level of volume resistivity ($\rho$) of the composite dictated the experimental set-up.

For electrically insulative composites, samples were in the form of 90 mm diameter disks that were cut from the molded plaques. Current-time curves were generated using a Kiethley Model 6517A Electrometer and Model 8009 Resistivity Test Fixture, all coupled to a personal computer for data acquisition. The volume resistivity for the insulative composites is based on the current flow in the sample after a 15 second elapse from the application of a step 100 direct current (DC) voltage. This procedure was repeated eight consecutive times on the sample with alternating polarity to arrive at an average current density and value of volume resistivity.

For composites exhibiting (semi)conductive characteristics (i.e. generally considered to be (semi)conductive at $\rho \leq 10^6 - 10^8$ $\Omega \cdot cm$ or less), 101.6 mm×6.35 mm×1.8 mm strips were cut from the molded plaques and colloidal silver paint was used to fabricate electrodes 50 mm apart along the strips in order to remove the contact resistance. A Fluke 75 Series II digital multimeter and a 2 point technique was used to measure the electrical resistance of the strips.

Figure 1:
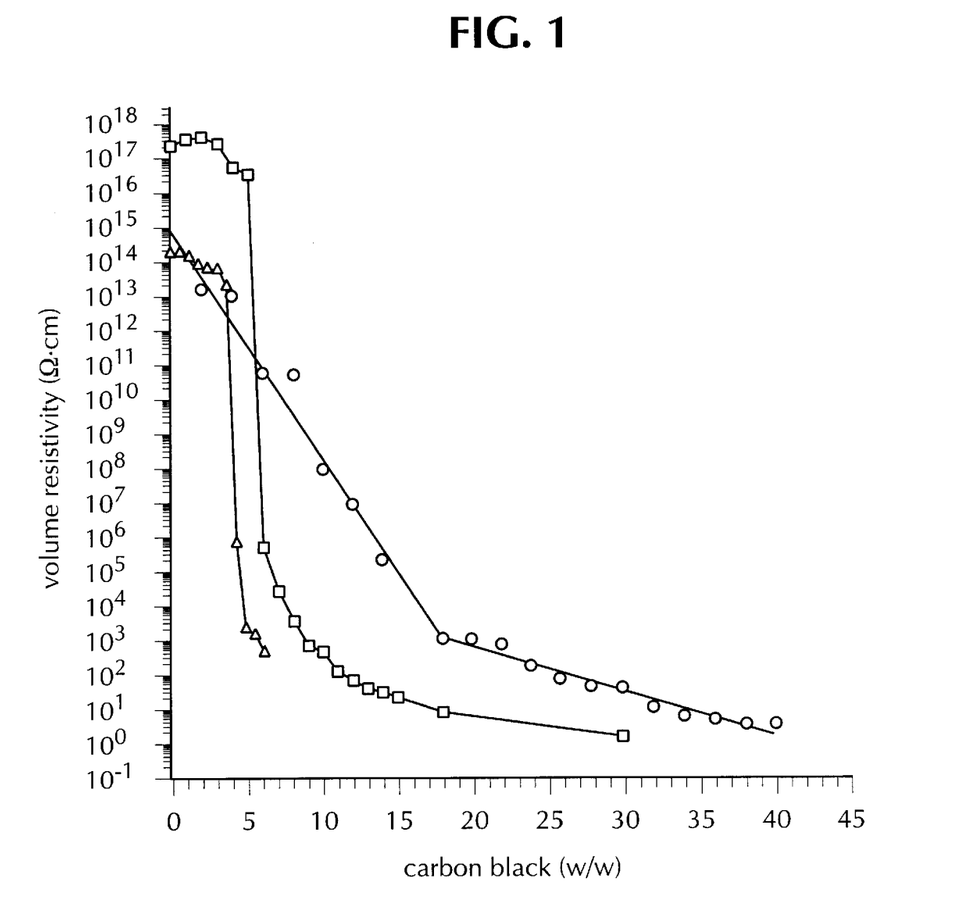
FIG. 1 is a graph depicting the volume resistivity of a EVA/HDPEICB composite ($\Delta$) of the present invention in comparison to the volume resistivity of a HDPE/CB composite ($\square$) and a EVA/CB composite ($\bigcirc$); it is noted that throughout the application EVA refers to poly(ethylene-co-vinyl acetate), HDPE refers to high density polyethylene, CB refers to carbon black and VA refers to vinyl acetate.

Referring now to FIG. 1, the effect of CB content on the volume resistivity of the heretofore described binary composites, HDPE/CB and EVA/CB is graphically depicted. The electrical conductivity of CB filled HDPE is reasonably well established. Polyethylene is an insulator with a volume resistivity on the order of $10^{17}$–$10^{18}$ $\Omega \cdot cm$, while CB has electrical characteristics that are semi-metallic in nature and exhibits a volume resistivity that varies considerably with its origin and chemical state, but is generally never less than about $10^{-1}$ $\Omega \cdot cm$.

Therefore, the volume resistivity of a binary composite HDPE/CB varies as the carbon content is increased from that of pure HDPE to that of pure CB, though the change in volume resistivity with composition does not exhibit a simple linear additive characteristic. A percolation threshold and drastic decrease in volume resistivity exists where the volume fraction of the CB becomes sufficient to provide continuous electrical paths through the HDPE. The conducting elements of these continuous electrical paths are either making physical contact between themselves or separated by very small distances across which electrons can hop by tunneling. The percolation threshold varies considerably with the shape and agglomeration of the CB as well as the type of polymer used, with the threshold occurring at higher volume fractions for carbon particles that have a low surface-to-volume ratios and low agglomeration. Increasing the CB content in compositions above the percolation threshold allows the composites to refine their conducting paths and establish network redundancies that raise the conductive cross-section of the material and lower the volume resistivity.

Unfilled EVA exhibits a volume resistivity of approximately $10^{14}$ $\Omega \cdot cm$, significantly lower than the unfilled HDPE. The increased conductivity of EVA is due in part to the polar groups of the VA comonomer. A strong correlation has been demonstrated in the enhanced conductivity of polymers with increasing polarity of the repeat unit. The EVA/CB binary composites do not exhibit, in the same manner as the HDPE/CB binary composites, the drop in volume resistivity at a well defined threshold of incorporated carbon black, but instead exhibit a sloping drop in volume resistivity between the unfilled EVA up to 18% by weight of incorporated CB. At CB concentrations greater than 18% by weight, the rate in decrease of volume resistivity with increasing carbon content is diminished.

In addition, the EVA/CB binary composites have a significantly higher volume resistivity, relative to the HDPE/CB binary composites, at all CB concentration levels past the HDPE/CB binary composite percolation threshold.

Referring again to FIG. 1, the volume resistivity-concentration curve is shown for the EVA/HDPE/CB composites. As exhibited in the binary composites, these EVA/HDPE/CB ternary composites do not exhibit a resistivity curve which is representative of an additivity rule. Insulating composites exhibit a decrease in volume resistivity with increasing levels of the HDPE/CB components as set forth in Table 3, and is related to an increased concentration of ionic charge carriers being introduced into the blend with the CB as well as an elevated propensity of electrons to effectively tunnel between isolated HDPE/CB domains with their diminishing separation distances. The percolation threshold of the EVA/HDPE/CB composites is 4.2% by weight CB and is significantly lower than that of the individually carbon filled HDPE or EVA. At a CB loading of about 5% by weight, the EVA/HDPE/CB composite exhibits a volume resistivity of $2.23 \times 10^3$ $\Omega \cdot cm$ which is almost 14 and 11 orders of magnitude lower than the HDPE/CB and EVA/CB binary composites, respectively, at the same level of incorporated CB.

TABLE 3

| Composite | Volume Resistivity ($\Omega \cdot cm$) |
| --- | --- |
| Unfilled HDPE | $2.348 \times 10^{17}$ |
| $M_0$ (Unfilled EVA) | $2.188 \times 10^{14}$ |
| $M_5$ | $2.211 \times 10^{14}$ |
| $M_{10}$ | $1.562 \times 10^{14}$ |
| $M_{15}$ | $9.343 \times 10^{13}$ |
| $M_{20}$ | $7.576 \times 10^{13}$ |
| $M_{25}$ | $6.874 \times 10^{13}$ |
| $M_{30}$ | $2.288 \times 10^{13}$ |
| $M_{35}$ | $6.700 \times 10^{5}$ |
| $M_{40}$ | $2.226 \times 10^{3}$ |
| $M_{45}$ | $1.416 \times 10^{3}$ |
| $M_{50}$ | $4.360 \times 10^{2}$ |
| $M_{100}$ | $6.490 \times 10^{1}$ |

Composite materials $M_{35}$–$M_{50}$ in this example are particularly illustrative of the present invention. It would be expected that the use of an acetylene black or carbon fibers or intrinsically conductive polymers in place of the furnace grade CB used in the present example would result in a percolation threshold <4.2% by weight conductive filler with comparable resistivities.

This example particularly demonstrates that the inventive composites exhibited enhanced conductivites above that of the individually filled CB filled polymers at equivalent CB concentrations.

It may also be seen from the following examples that increases in the conductivity of the composites may be achieved through annealing, with compositions that contained CB at levels close to the percolation concentration experiencing the greatest benefit. Optical analysis of the annealed composites indicated a coarsening of the blend morphology which assists in improving the conductivity of the composites.

EXAMPLE 2

Working

EVA/HDPE/CB composites designated $M_0$–$M_{100}$, from Example 1, were further subjected to an annealing process after the molding in Example 1. The foregoing composite samples were heated in steps of 10° C. and allowed to equilibrate for 15 minutes at each temperature up to a maximum temperature of 120° C. In a like manner, the composite samples were subsequently cooled back to room temperature.

Figure 2:
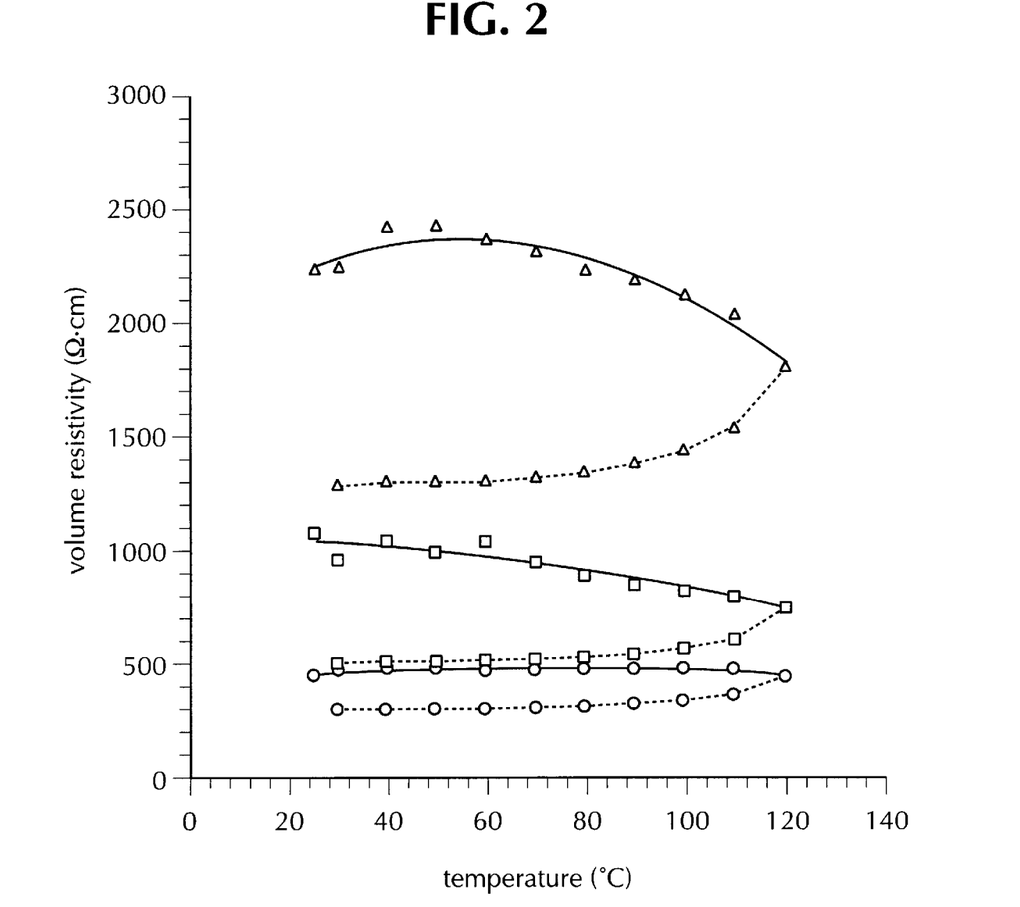
FIG. 2 is a graph depicting the reproducibility of the volume resistivity upon heating (–) and cooling ( . . . ) and the increase in conductivity with coarsening of the morphology of EVA/HDPE/CB composites of the present invention for samples: $M_{40}$ ($\Delta$), $M_{45}$ ($\square$), and $M_{50}$ ($\bigcirc$) by annealing.

Referring to FIG. 2, the effect of the annealing cycle on the volume resistivity of the $M_{40}$, $M_{45}$, and $M_{50}$ composite samples is graphically depicted. As can be seen from the FIG. 2, initially, the volume resistivity during the first heating cycle changed in an unpredictable manner from one temperature to the next, especially evident in the lower HDPE/CB content ternary composites, and eventually settled on a general increase in conductivity with subsequent higher temperatures. The reduction in volume resistivity continued during the cooling cycle and resulted in ternary composites that exhibited an increase in room temperature conductivity before and after the annealing process. The $M_{40}$ composite realized a 42.7% decrease in volume resistivity after the annealing process. In a like manner, the $M_{45}$ and $M_{50}$ composites realized decreases in volume resistivity of 54.5% and 31.2% respectively.

Composites that contained CB at levels close to the percolation concentration of 4.2% by weight to about 6% by weight CB generally exhibited the greatest increase in conductivity from annealing; while the insulating composites (i.e. $M_0$–$M_{30}$ did not exhibit any significant variation in the measured volume resistivity with annealing).

The morphological characteristics of the conductive EVA/HDPE/CB composites $M_0$–$M_{100}$ were observed before and after the annealing process heretofore described. Composite samples prepared by microtoming 5 $\mu$m thick slices were viewed under an optical microscope with crossed polarizers.

Figure 3:
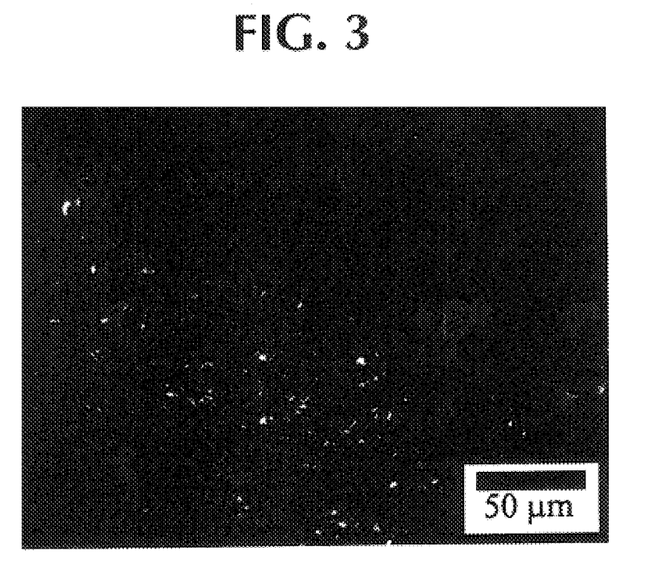
FIG. 3 is an optical micrograph of the initial morphology of the EVA/HDPE/CB $M_{45}$ composite of the present invention after molding.

Referring now to FIG. 3, which is the optical micrograph prepared and viewed as heretofore described of composite sample $M_{45}$ after molding, but before the annealing process, the HDPE/CB phase of the composite appears to be finely dispersed in the initially molded plaques, making the composite almost opaque to visible light.

Figure 4:
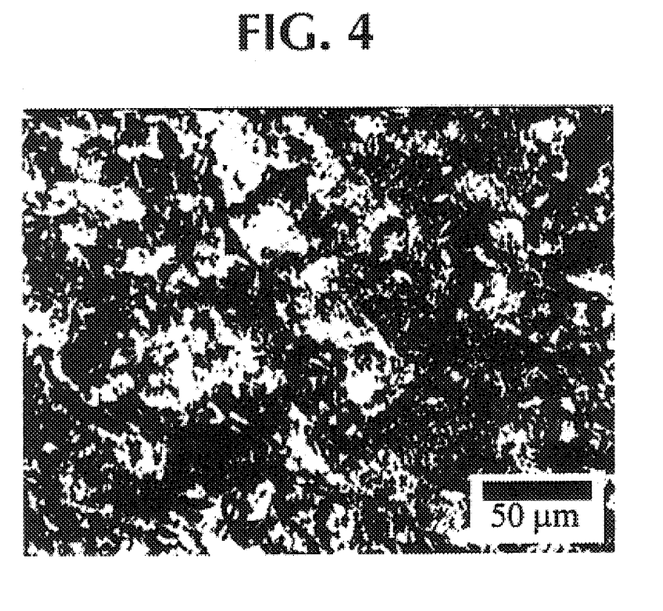
FIG. 4 is an optical micrograph of the coarsened morphology of the EVA/HDPE/CB $M_{45}$ composite of the present invention after initial heating-cooling cycle.

In contrast, referring to FIG. 4, which is the optical micrograph prepared and viewed as previously described of composite sample $M_{45}$ after the annealing process, a coarsening of the morphology from that in FIG. 3 is seen. In FIG. 4, the composite exhibits both opaque and substantially transparent regions. The substantially transparent regions correspond to the major phase EVA portion of the composite, while the minor phase of the HDPE/CB in the opaque regions have a higher concentration of conductive filler due to the coarsening of the morphology brought on during the heretofore discussed annealing process, thus giving the total composite a greater conductivity.

EXAMPLE 3

CPC materials having reduced CB content may be made according to the present invention using commercial grades of a random copolymer of EVA, HDPE, and CB, characteristics of such constituents previously set forth in Table 1.

The mixing procedure for the ternary composites of the invention is comprised of adding the HDPE into a Brabender internal rotating mixer with a 300 $cm^3$ cavity preheated to 170° C. and allowing the HDPE to mix for 6 minutes at a 40 rpm mixing rate prior to the addition of the carbon black. After the addition of the CB, the compound was allowed to mix for an additional 9 minutes, which insured a uniform distribution of CB within the HDPE.

The HDPE/CB composite is then removed from the mixer, pulverized in small particles, and annealed from just below the melting point of the HDPE. This annealing process of the HDPE/CB composite which incorporates a semicrystalline polymer, the HDPE, refines and increases the crystalline phase resulting in an improvement of the conductive network.

The EVA is added to the Brabender internal rotating mixer, preheated to about 60° C. or in any event to a temperature below the melting point of HDPE, and allowed to mix for 6 minutes at a 40 rpm mixing rate. The pulverized and annealed HDPE/CB composite is added to the EVA in the Brabender internal rotating mixer. The mixture is allowed to mix for an additional 10 minutes. The final composite is then molded at a pressure of about 6 MPa for 12 minutes at 60° C. into plaques of about 0.75 mm in thickness.

In this example, other major phase constituents other than EVA may be employed, for example PS or PMMA, or any suitable major phase polymer as heretofore described having a melting temperature below that of the HDPE or minor phase material.

According, this example demonstrates the inventive ternary semiconductive composites with low levels of conductive filler content by modifying the surface area to volume ratio of the minor phase/CB (or binary) material and therefore lowering the percolation threshold.

EXAMPLE 4

In a further embodiment of the present invention, a quaternary immiscible blend may be formed using the constituents: PS, EVA, HDPE, and CB by the method comprising the steps set forth hereinafter.

The PS is added to the Brabender internal rotating mixer preheated to 170° C. and allowed to mix for about 6 minutes at 40 rpm, prior to the addition of the EVA/HDPE/CB ternary composite already prepared as in the foregoing Examples 1 and 2. This blend is allowed to mix for an additional 9 minutes. The final quaternary composite is then molded at a pressure of about 6 MPa for 12 minutes at 170° C. in plaques of about 0.75 mm in thickness. In this example, the follow constituents may be employed: 3.6% by weight CB; 26.4% by weight HDPE; 30% by weight EVA; 40% by weight PS and 40% by weight VA in the EVA.

In a multiple percolation like this heretofore described, it is important that the quaternary composite is an immiscible blend with distinct co-continuous phases, and that the conductive filler is in the continuous phase. Thus a CPC composite with less than about 4% by weight of CB of the total PS/EVA/HDPE/CB may be formed with good electrical conductivity.

EXAMPLE 5

The previous Examples 1–4 may be repeated but substituting an intrinsically conductive polyaniline polymer in the amount of less than about 12% by weight ratio and preferably less than about 4% by weight ratio to the HDPE or other suitable semicrystalline minor phase polymer to achieve the CPC composite of the present invention with reduced conductive filler content and good electrical conductivity. For example, the conductive polyaniline polymer may be about ≦4% by weight based on total composite weight.

Accordingly, this example demonstrates the inventive ternary or quaternary semiconductive composites having low conductive filler contents due to selection of conductive filler with greater affinity for creating a conductive network.

EXAMPLE 6

CPC materials having reduced CB content may be made according to the present invention using commercial grades of a random copolymer of EVA, HDPE, and CB, characteristics of such constituents previously set forth in Table 1.

The mixing procedure for the ternary composites of the invention is comprised of adding the HDPE into a Brabender internal rotating mixer with a 300 cm$^3$ cavity preheated to 170° C. and allowing the HDPE to mix for 6 minutes at a 40 rpm mixing rate prior to the addition of the CB. After the addition of the CB, the compound was allowed to mix for an additional 9 minutes, which insured a uniform distribution of CB within the HDPE.

The binary composite thus formed is extruded into threads approximately 2 mm long and 0.25 mm in diameter.

EVA is added to the Brabender internal rotating mixer, preheated to about 60° C., and in any event below the melting temperature of the HDPE, and allowed to mix for 6 minutes at 40 rpm. The extruded binary composite threads are then added to the EVA in the Brabender internal rotating mixer. The mixture is allowed to mix for an additional 10 minutes. The final composite is then molded at a pressure of about 6 MPa for 12 minutes at 60° C. into plaques of about 0.75 mm in thickness. In this example, the percolation threshold is lowered by modifying the morphology of minor phase material.

Thus, in accordance with the present invention and in view of the foregoing examples and disclosures set forth herein, a CPC material having less than or equal to about 6% by weight conductive dispersion content of CB residing in a minor phase of HDPE is mixed with EVA. By modifying the level of HDPE in the EVA, crystallinity of HDPE, level of VA in the EVA copolymer, and CB content in the HDPE, a highly conductive compound may be generated with a resistivity of less than about 10$^6$ Ω·cm and preferably less than about 10 Ω·cm. In addition, due to the low levels of required CB to impart a high conductivity to the CPC material, the rheology of the compound is more analogous to an unfilled compound in terms of extrusion properties and processability.

In further accordance with the present invention and in view of the foregoing, it can be seen that the afore-described advantages and superior results may be achieved by the selection of a conductive filler with a chemical structure which results in an inherently high conductivity and an affinity to develop a strong network, and by the modification of the thermodynamic stability of the conductive filler and the minor polymer phases to encourage coarsening of the filler/minor phase morphology.

The advantages are also realized by selecting a minor phase polymer with a high level of crystallinity such that the conductive filler and minor phase material preferentially phase separate in order to increase the concentration of the conductive filler in the amorphous phase, as well as by reducing the percolation threshold of the minor phase/conductive filler material in the major phase material through a processing approach, such as the afore-described extruding, annealing and pulverizing means, to changing the morphology of the minor phase/conductive filler material.

The advantages are also realized by coarsening the morphology of the major/minor phase through modifying the thermodynamic stability of the polymer phases to promote immiscibility by selecting suitable minor/major pair materials.

As also described above, advantages of the present invention are achieved by post-annealing of the CPC material to coarsen the morphology of the major/minor phase, as well as by increasing the crystalline component of the major phase polymer; for example, modifying the VA content in the EVA as heretofore described or by incorporating 0.01% by weight to about 2% by weight of a nucleating agent in the major phase material to promote crystallinity in order to increase the concentration of the minor phase in the amorphous major phase.

It is to be understood that the conventional additives such as nucleating agents and antioxidants may also be added into the composite material or in the major phase or minor phase materials in the amount of about 0.01% by weight to about 5% by weight without departing from the spirit and scope of the invention. Exemplary nucleating agents are talc, silica, mica, and kaolin. Examples of antioxidants are: hindered phenols such as tetrakis[methylene(3,5-di-tert-butyl-4-hydroxyhydrocinnamate)]-methane, bis[(beta-(3,5-diterbutyl-4-hydroxybenzyl)methylcarboxyethyl)]sulphide, 4,4-thiobis(2-methyl-6-tert-butylphenol), 4,4-thiobis(2-tert-butyl-5-methylphenol), 2,2-thiobis(4-methyl-6-tertbutylphenol), and thiodethylene bis(3,5-di-tert-butyl-4-hydroxy)hydrocinnamate; phosphites and phosphonites such as tris(2,4-di-tert-butylphenyl)phosphite and di-tertbutylphenylphosphonitie; thio compounds such as dilaurylthiodipropionte, dimyristylthiodipropionate, and disterylthiodiprpionate; various siloxanes; and various amines such as polymerized 2,2,4-trimethyl-1,2-dihydroquinoline.

While various embodiments of the invention have been shown and described, it is to be understood that the above-described embodiments are merely illustrative of the invention and other embodiments may be devised by those skilled in the art which will embody the principles of the invention and fall within the spirit and scope thereof.

What is claimed is:

1. A method of producing a conducting polymer composite material comprising the steps of:

mixing a semicrystalline polymer having a melting temperature in a mixer, said mixer preheated to above the melting temperature of said semicrystalline polymer;

adding a conductive filler to said semicrystalline polymer in said mixer in an amount equal to or greater than the percolation threshold and sufficient to generate a continuous conductive network in said semicrystalline polymer;

mixing said conductive filler material and said semicrystalline polymer until said conductive filler material is uniformly distributed in said semicrystalline polymer, thereby forming a binary composite having a melting temperature; and mixing a major phase material having a melting temperature with said binary composite in said mixer preheated to above the melting temperature of said major phase material, until said binary composite is uniformly distributed in said major phase material, such that a weight ratio of said binary composite to said major phase material is sufficient for said binary composite to be equal to or greater than the percolation threshold and sufficient to generate a continuous conductive network in said major phase material, said major phase material being selected from a group of polymers which when mixed with said binary composite will not engage in electrostatic interactions that promote miscibility, such that a (semi)conductive ternary composite with distinct co-continuous phases is formed.

2. The method of claim 1, further comprising the step of: annealing said ternary composite, thereby coarsening morphology of said ternary composite.

3. The method of claim 1, further comprising the step of: mixing a second major phase material having a melting temperature with said ternary composite in said mixer preheated to above the melting temperature of said second major phase material, until said ternary composite is uniformly distributed in said second major phase material, such that a weight ratio of said ternary composite to said second major phase material is sufficient for said ternary composite to be equal to or greater than the percolation threshold and sufficient to generate a continuous conductive network in said second major phase material, said second major phase material being selected from a group of polymers which when mixed with said ternary composite will not engage in electrostatic interactions that promote miscibility with said binary composite or said major phase material, such that a (semi)conductive quaternary composite with distinct co-continuous phases is formed.

4. The method of claim 3, further comprising: annealing said quaternary composite, thereby coarsening morphology of said quaternary composite.

5. The method of claim 1, further comprising: annealing said binary composite to below the melting temperature of the binary composite prior to mixing said major phase material with said binary composite, said major phase material having a melting temperature less than the melting temperature of said binary composite; and mixing said major phase material and said binary composite at a temperature below said melting temperature of said binary composite.

6. The method of claim 1, further comprising: extruding said binary composite into threads prior to mixing said major phase material with said binary composite, said major phase material having a melting temperature less than the melting temperature of the binary composite; and mixing said major phase material and said extruded threads of binary composite at a temperature below said melting temperature of said binary composite.

7. The method of claim 6 wherein said extruded threads are about 2 mm long and about 0.25 mm in diameter.

8. The method of claim 1, further comprising: pulverizing said binary composite prior to mixing said major phase material with said binary composite, said major phase material having a melting temperature less than the melting temperature of the binary composite; and mixing said major phase material and said pulverized binary composite at a temperature below said melting temperature of said binary composite.

9. The method of claim 1, wherein said conductive filler material is selected from the group of consisting of carbon black, graphite, metallic particles, intrinsically conductive polymers, carbon fibers and mixtures thereof.

10. The method of claim 1, wherein said major phase material is comprised of a poly(ethylene-co-vinyl acetate).

11. The method of claim 10, wherein said poly(ethylene-co-vinyl acetate) has a vinyl acetate content of greater than about 40% by weight.

12. The method of claim 1, wherein the conducting polymer composite material further comprises a material selected from the group consisting of an antioxidant, a nucleating agent, and mixtures thereof.

13. The method of claim 3, further comprising:
repeating the steps of claim 3 with additional major phase materials, said additional major phase materials being polymers which when mixed with each other, with said major phase material, with said second major phase material, and with said minor phase material will not engage in electrostatic interactions the promote miscibility, such that a multi-phase composite material having distinct co-continuous phases is formed.

14. A method of producing a conducting polymer composite material comprising the steps of:
mixing a semicrystalline polymer having a melting temperature in a mixer, said mixer preheated to above the melting temperature of said semicrystalline polymer;
adding a conductive filler to said semicrystalline polymer in said mixer in an amount equal to or greater than the percolation threshold and sufficient to generate a continuous conductive network in said semicrystalline polymer;
mixing said conductive filler material and said semicrystalline polymer until said conductive filler material is uniformly distributed in said semicrystalline polymer, thereby forming a binary composite having a melting temperature;
mixing a major phase material having a melting temperature with said binary composite in said mixer preheated to above the melting temperature of said major phase material, until said binary composite is uniformly distributed in said major phase material, such that a weight ratio of said binary composite to said major phase material is sufficient for said binary composite to be equal to or greater than the percolation threshold and sufficient to generate a continuous conductive network in said major phase material, said major phase material being selected from a group of polymers which when mixed with said binary composite will not engage in electrostatic interactions that promote miscibility, such that a (semi)conductive ternary composite with distinct co-continuous phases is formed, and
mixing a second major phase material having a melting temperature with said ternary composite in said mixer preheated to above the melting temperature of said second major phase material, until said ternary composite is uniformly distributed in said second major phase material, such that a weight ratio of said ternary composite to said second major phase material is sufficient for said ternary composite to be equal to or greater than the percolation threshold and sufficient to generate a continuous conductive network in said second major phase material, said second major phase material being selected from a group of polymers which when mixed with said ternary composite will not engage in electrostatic interactions that promote miscibility with said binary composite or said major phase material, such that a (semi)conductive quaternary composite with distinct co-continuous phases is formed.

15. The method of claim 14, further comprising annealing said quaternary composite, thereby coarsening the morphology of said quaternary composite.

16. The method of claim 14, further comprising:
repeating the steps of claim 14 with additional major phase materials, said additional major phase materials being polymers which when mixed with each other, with said major phase material, with said second major phase material, and with said minor phase material will not engage in electrostatic interactions that promote miscibility, such that a multi-phase composite material having distinct co-continuous phases is formed.

* * * * *

UNITED STATES PATENT AND TRADEMARK OFFICE
CERTIFICATE OF CORRECTION

PATENT NO. : 6,277,303 B1  
DATED : August 21, 2001  
INVENTOR(S) : Foulger

It is certified that error appears in the above-identified patent and that said Letters Patent is hereby corrected as shown below:

Column 3,
Line 24, change "3,735,025" to -- 09/113,914 --;

Column 5,
Line 54, change "EVA/HDPEICB" to -- EVA/HDPE/CB --.

Signed and Sealed this

Thirtieth Day of September, 2003

JAMES E. ROGAN
*Director of the United States Patent and Trademark Office*